United States Patent [19]

Cannell et al.

[11] 4,156,155
[45] May 22, 1979

[54] COMBINED ROTARY ELECTRICAL CONTACT AND SHAFT SEAL SYSTEM

[75] Inventors: Michael J. Cannell, Annapolis; Slade L. Carr, Crofton; Donald B. Steen, Bowie, all of Md.

[73] Assignee: The United States of America as represented by the Secretary of the Navy, Washington, D.C.

[21] Appl. No.: 846,074

[22] Filed: Oct. 27, 1977

[51] Int. Cl.² ............................................. H02K 13/12
[52] U.S. Cl. ..................................... 310/219; 310/178; 310/191; 31/209
[58] Field of Search ................ 310/178, 219, 191, 209

[56] References Cited

U.S. PATENT DOCUMENTS

| | | | |
|---|---|---|---|
| 3,312,843 | 4/1967 | Krulls | 310/219 X |
| 3,705,995 | 12/1972 | Chabrerie et al. | 310/219 X |
| 3,984,715 | 10/1976 | Kullmann et al. | 310/178 X |
| 4,047,063 | 9/1977 | Reece | 310/219 X |

Primary Examiner—Donovan F. Duggan
Attorney, Agent, or Firm—R. S. Sciascia; Q. E. Hodges

[57] ABSTRACT

A combined rotary electrical contact and seal system for rotating machines, using a liquid metal for electrical continuity and convertible labyrinth and rotating rubbing face seals to effect a nearly perfect seal system for the liquid metal, both while the machine is at rest and during rotation at normal operating speed. To avoid leakage of the liquid metal while the rotor is stopped or at low speeds, a face seal is effected by a slight axial movement of the rotor. As the rotational speed increases, the rubbing face seal becomes a labyrinth seal to avoid wear while maintaining an adequate seal. The liquid metal level is monitored and drains are provided to recover any leakage losses, and a replenishment system is provided to maintain the liquid metal at a proper level.

4 Claims, 4 Drawing Figures

COMBINED ROTARY ELECTRICAL CONTACT AND SHAFT SEAL SYSTEM

The invention described herein may be manufactured and used by or for the Government of the United States of America for governmental purposes without the payment of any royalties thereon or therefor.

BACKGROUND OF THE INVENTION

This invention relates to rotary electrical contacts and seals for horizontally mounted rotating machines, and more particularly to liquid metal, rotary electrical contacts combined with a convertible rubbing face seal and labyrinth seal that is effected by axial movement of the rotor.

Prior art machines have almost exclusively employed graphite brushes rubbing against metal commutators as the means for forming sliding electrical contacts. Liquid metal contacts offer several advantages over brush-commutator systems, including lower voltage requirements, higher current-carrying capability, and lower frictional and $I^2R$ heating losses. In spite of these advantages, very few machines have been built which use liquid metal contacts, except for hompolar electrical generators used for research purposes.

The problems associated with generators are not the same as for motors because generators are not stopped or started frequently, and generally rotate in only one direction. However, similar precautions have to be taken during start-up of both generators and motors. But, because a motor is frequently started, stopped, and reversed, the use of prior art liquid metal contracts would be impracticably cumbersome. Thus, there has been little use of such contacts for motors. As stated above, one of the serious difficulties associated with the use of liquid metal rotary electrical contacts has been their inability to maintain continuity of the electrical circuit under all conditions of rotational speed including stopping, starting, and reversing of the machine. Another difficulty has been the chemical reactivity of the liquid metals with atmospheric gasses. Further, wear particles from machine materials and other contaminants can cause chemical changes in the liquid metal and render it unfit for use after only a limited time. Still another difficulty is the possible leakage of the liquid metal from the machine into the environment. Most conductive liquid metals are severe pollutants, such as mercury. Some materials, such as sodium-potassium (Nak) alloys, are particularly objectionable contaminants and difficult to use because of their corrosive and pyrophoric nature. Therefore, there is a need for a nearly perfect seal when using liquid metal high current rotary contacts.

SUMMARY OF THE INVENTION

Briefly, the instant invention overcomes the disadvantages of the prior art rotary electrical contact and seal systems by providing a nearly perfect seal system, and further includes liquid metal level monitoring and replenishment features.

The seal system is a convertible combination of a labyrinth seal and a rubbing face seal. The stator has a plurality of thin, annular, washer-shaped metal seal rings extending inwardly toward the axis of the machine. The rotor, mounted coaxially in the stator, has a plurality of annular inset rubbing surfaces therein, made of plastic or like material, into which annular grooves are cut for accepting the washer-shaped seal rings of the stator. These grooves provide low friction rubbing surfaces for the rings when the motor is operated at low speeds or is stationary, and the rings are in contact with the rubbing surfaces. The annular grooves are wider than the rings to permit clearance between the rings and the rubbing surface. Means, such as hydraulic pressure on the end bearing of the machine, are provided to axially position the entire rotor and thereby create a rubbing seal or a labyrinth seal, as required.

The rotary electrical contact system comprises a plurality of grooves in the stator into which annular ridges on the rotor extend and can turn, while maintaining clearance at either axial position of the rotor. A conductive liquid metal bridges the space between the ridges and the grooves and provides for current flow therebetween. Supply passages, provided in the stator, enter the grooves for replenishment of any liquid metal that may be lost during operation of the machine. Drain passages are provided in the stator intermediate the supply passages to recover any liquid metal that might leak past the rings.

STATEMENT OF THE OBJECTS OF THE INVENTION

Accordingly, an object of the invention is to provide a new and efficient combined rotary electrical contact and seal system.

Another object of the instant invention is to provide as nearly a perfect seal as possible for a seal system for rotary machines, which is effective both at rest and at operating speeds.

Still another object of the instant invention is to provide a safe and effective liquid metal rotary electrical contact system.

A further object of the present invention is to provide a seal system that is convertible from a rubbing face seal to a labyrinth seal.

A still further object of the present invention is to provide a liquid metal rotary electrical contact system that provides for the replenishment of lost or contaminated liquid metal.

BRIEF DESCRIPTION OF THE DRAWINGS

Other objects, advantages, and novel features of the invention will become apparent from the following detailed description of the invention when considered in conjunction with the accompanying drawings wherein.

DESCRIPTION OF THE PREFERRED EMBODIMENT

Figure 1:
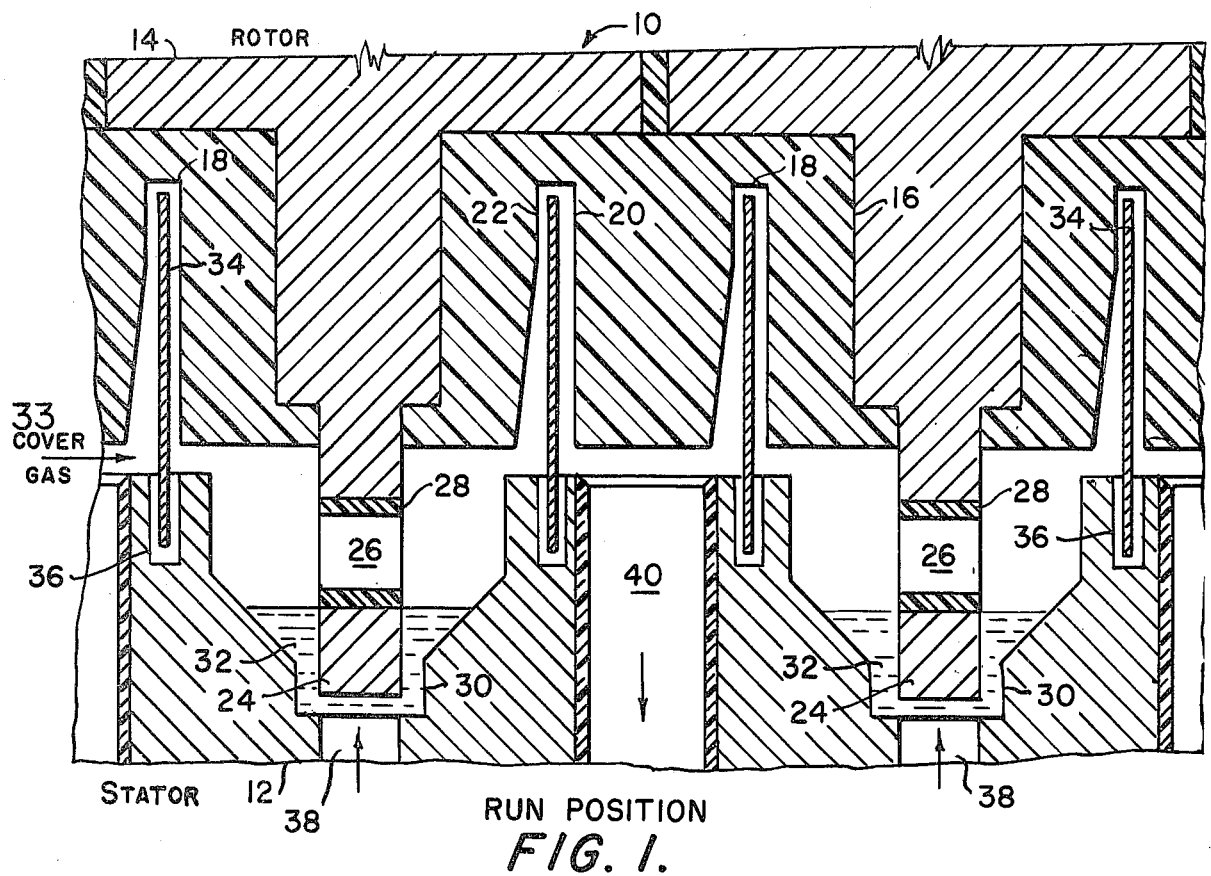
FIG. 1 is a cross-sectional view of a portion of the rotor and stator at the seal and contact area, with the rotor in the "run" or normal operating speed position.

Referring now to the drawings, wherein like reference numerals designate the same part throughout the several views, there is shown in FIG. 1 a broken-away part of a rotating electric machine 10, such as a motor or generator, showing the seal and contact arrangement and having a stator 12 and coaxially therein a rotor 14, both made substantially of an electrically conductive metal. As only a portion of the rotor and stator are shown, no axis or outside portion of the machine can be seen. Referring to the seal system in the rotor, the rotor 14 contains a plurality of inset rubbing surfaces 16 made of an insulating plastic, or the like. Each inset rubbing surface 16 has, for example, a set of two narrow, deep annular grooves 18 formed therein. One side 20 of each groove 18 is perpendicular to the axis of the rotor 14, and the other side 22 is spaced from and angled with respect to the first side 20.

Referring to the rotating electrical contact system, shown best in FIG. 1, extending radially outwardly from the rotor 14, between the inset rubbing surfaces 16, are annular ridges 24, which may be integral with the rotor and made of an electrically conductive metal. A plurality of holes 26 (one shown), passing through each ridge 24 in a circular pattern, are provided to equalize the liquid metal 32 pressure on each side of the annular ridge 24. An insulating coating 28, made of plastic, epoxy, or like material, is applied to the interior surface of each of the holes 26 to prevent any electrical current in the liquid metal 32 while it is in the holes 26.

The annular ridges 24 on the rotor 14 rotate in annular channels 30 formed in the stator 12. A liquid metal 32, such as sodium-potassium, is contained within the annular channels 30 of the stator 12, so that when rotor 14 is at rest, the liquid metal 32 is collected in the channels 30 at the bottom of the electrical machine 10. When certain liquid metals are used, it may be desirable to use an inert cover gas 33 such as nitrogen or the like, which displaces the air normally present to prevent the liquid metal from reacting with such air within the machine. At normal operating speeds, the liquid metal 32 is distributed evenly around the periphery of the annular channels 30. Referring to the seal system on the stator 12, between each of the rotating electrical contacts are, for example, a set of two washer-shaped seal rings 34 set in annular slots 36 formed in the stator 12, and affixed by epoxy, or like material. These seal rings 34 extend radially inwardly into the narrow deep grooves 18 formed in the inset rubbing surfaces 16 in the rotor 14.

Figure 2:
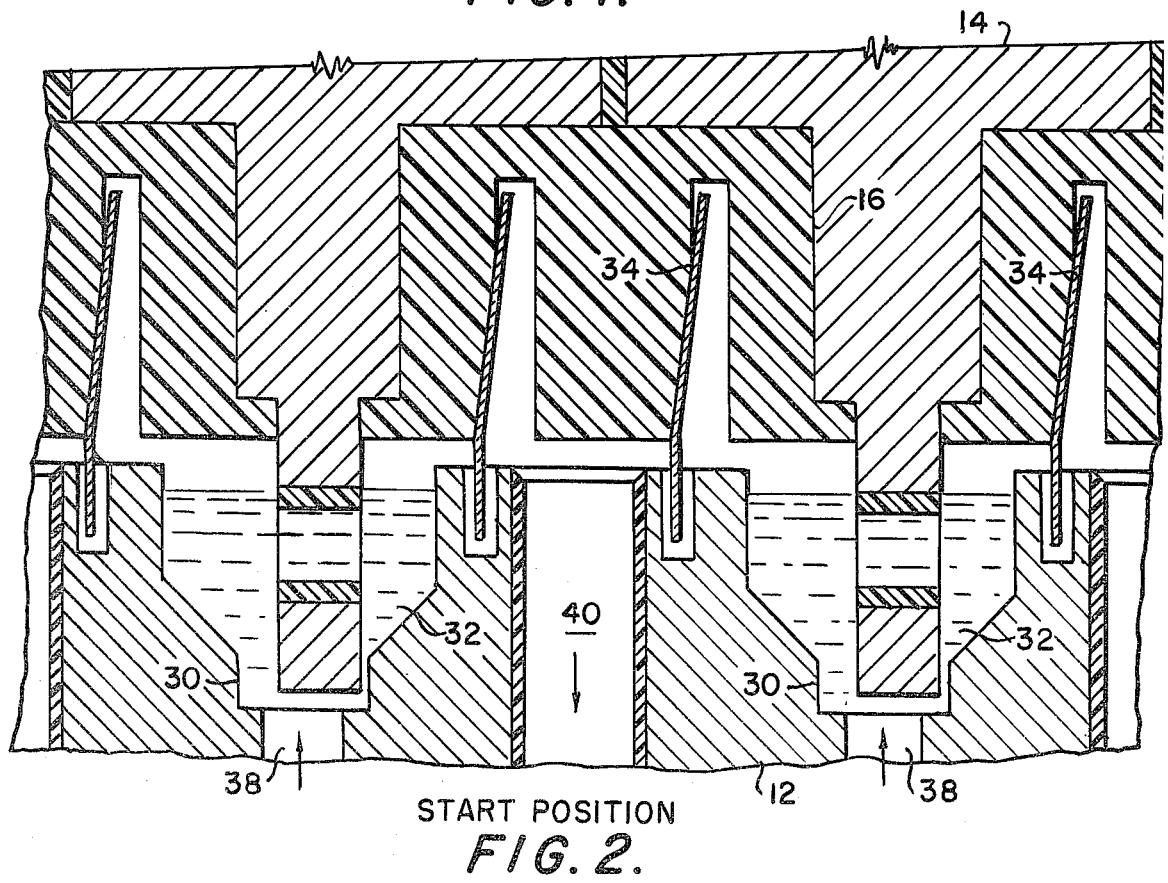
FIG. 2 is a cross-sectional view of a portion of the rotor in the "at rest" or low operating speed position.
Figure 3:
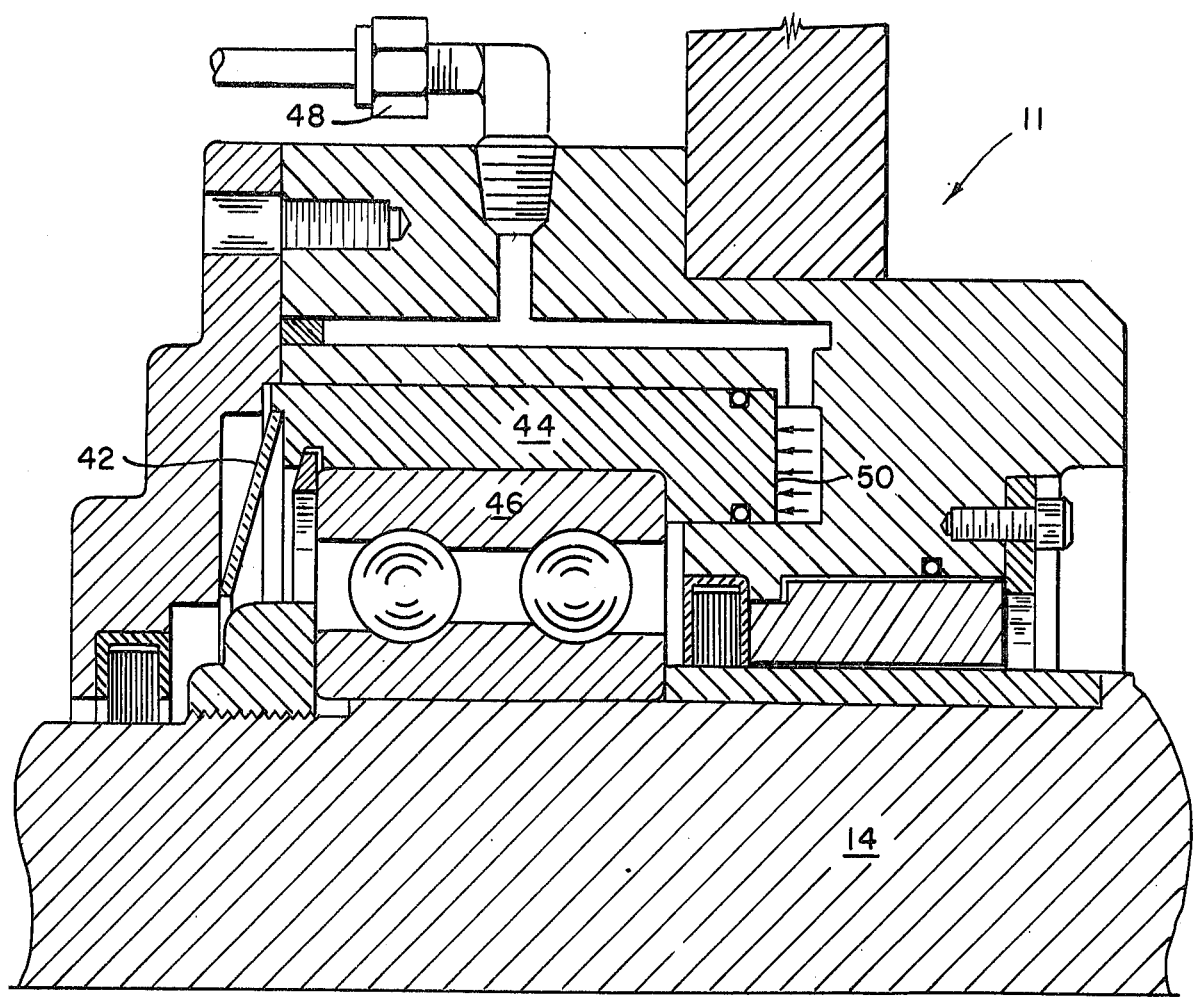
FIG. 3 is a cross-sectional view of the bearing housing of the rotary electric machine showing means for moving the rotor axially.

Referring now to FIG. 2, the rotor 14 is shown at rest and the liquid metal 32 is pooled so that it has risen to a level in the wider part of the channels 30. Fill lines 38, in the stator 12, connect with the bottom of each of the annular channels 30. Between each set of seal rings 34 is a drain line 40 formed in the stator 12. Compared with FIG. 1, FIG. 2 shows the rotor 14 axially displaced to the right (in the drawing), whereupon the seal rings 34 of the stator 12 contact the angled sides 22 of the grooves 18 in the rubbing surfaces 16 of the rotor 14. The axial displacement is achieved by the bearing mechanism 11 in a bearing housing shown in FIG. 3, where the return spring 42, in the form of a dished washer, bears against a slideable bearing retainer 44 to move a bearing 46, and therefore the rotor 14, to the right (in the drawing). The rotor is moved to the left (in the drawing) during rotation at normal operating speed by applying hydraulic pressure through a connecting port 48 and thence against the end 50 of the slideable bearing retainer 44 to overcome the force of the return spring 42. Dual-mode sealing is thus achieved by using hydraulic pressure to effect a labyrinth seal and the return spring to effect a face seal.

Figure 4:
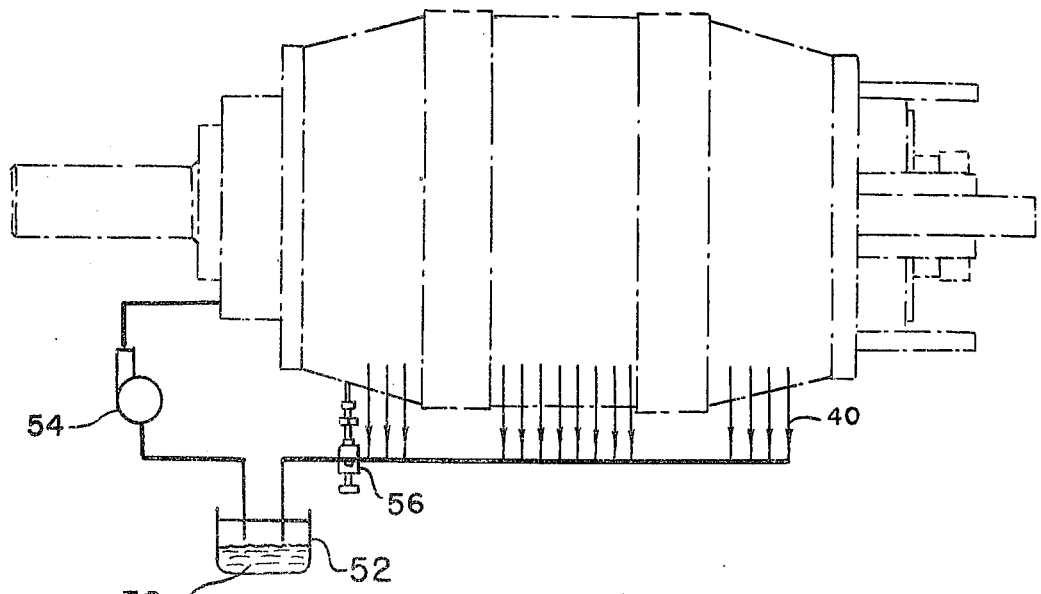
FIG. 4 is a schematic view of the rotary electric machine showing the cover gas and liquid metal scavenging system, with one fill and drain control system shown (typical for each fill and drain passage).

Referring now to FIG. 4, the outside of the rotating machine is shown with an active liquid metal scavenging system and an injector fill system. The scavenging system couples together all the drain lines 40 from inside the machine and ensures that all the lost liquid metal 32 and inert cover gas 33 is carried to a sealed sump 52. The reusable inert cover gas 33 is pumped off the top of the sump 52 by a gas pump 54 and then back into the machine at the rotary electrical contact and shaft seal system areas. The liquid metal 32 in the sump 52 must be cleaned before it is used again, because no cover gas system is so completely free from impurities that all chemical reaction with the liquid metal can be prevented. After a period of use, the liquid metal may be removed from the sump 52 and cleaned. With injectors 56 (one shown) each attached to a fill line 38 and having a sealed rollover diaphragm and plunger (not shown) containing the cleaned liquid metal, the channels 30 may be replenished to the proper level.

In the operation of the combined rotary electrical contact and shaft seal system, electric currents of tens of thousands of amperes may flow from the stator to the rotor through the liquid metal 32 in channels 30. The liquid metal 32 allows the rotor 14 to turn freely and at the same time maintains good electrical continuity.

At zero speed, as shown in FIG. 2, the liquid metal 32 pools in the bottom of the machine in channels 30. As the rotational speed increases, frictional drag on the liquid metal causes it to be dragged around, and centrifugal force forces the liquid metal to the periphery of the stator channels 30, as shown in the running condition of FIG. 1. Also, at zero speed, referring to the seal system, the rotor 14 is forced to the right by the return spring 42. This axial position of the rotor causes the angled sides 22 of the grooves 18 to bear against the seal rings 34 of the stator 12, bending them and effecting a nearly perfect rubbing face seal.

As rotational speed is increased, hydraulic pressure applied through the port 48 acts on end 50 of the slideable bearing journal 44 to overcome the force of the return spring 42 and thereby axially move the rotor to the left (in the drawing). In this position, the seal rings 34 of the stator are in the middle of the grooves 18, effecting a labyrinth seal having no rubbing frictional drag. If, while the rotor is spinning, liquid metal is forced past the seals, a pressure transducer (not shown) mounted in each of the filled channels 30, will indicate when the liquid metal level has fallen. The injectors 56 then will be operated either manually or by a servo-mechanism (not shown) to bring the particular channel level up to its optimum operating level. Thus, with this invention, liquid metal rotary contacts, including mercury and sodium-potassium, may be used, as for example in superconducting rotary machines, without the attendant problems of pollution, explosion, or corrosion.

Obviously many modifications and variations of the present invention are possible in the light of the above teachings. It is therefore to be understood that within the scope of the appended claims, the invention may be practiced otherwise than as specifically described herein.

What is claimed is:

1. A method of effecting an electrical circuit between a stator and a rotor in a rotary electric machine comprising the steps of:

providing an electrical contact surface on said rotor;
providing an electrical contact surface on said stator;
providing an electrically conductive liquid in contact with said rotor and said stator contact surfaces; and axially moving said rotor to effect a rubbing face seal while said rotor is at rest and a labyrinth seal while said rotor is at speed, thereby effectively retaining said liquid metal between said electrical contact surfaces.

2. A combined rotary electrical contact and seal system for rotary electric machines comprising:
   a stator;
   a rotor mounted for rotation coaxially within said stator;
   a liquid metal rotary electrical contact for coupling said rotor to said stator; and
   convertible means for sealing said liquid metal in said rotary electric machine such that a rubbing face seal is effected while said machine is at rest or at low speed, convertible to a labyrinth seal while said machine is at operating speed.

3. The combined rotary electrical contact and seal system of claim 2, wherein said convertible means for sealing said liquid metal in said rotary electric machine comprises:
   a plurality of narrow annular rubbing surface grooves formed in said rotor and spaced between said annular ridges;
   a plurality of washer-shaped seal rings affixed to said stator and extending radially inwardly into said narrow annular rubbing surface grooves in said rotor; and
   means for axially moving said rotor to effect a rubbing face seal while said rotor is at rest and a labyrinth seal while said rotor is at speed.

4. The combined rotary electric contact and seal system of claim 3, wherein said means for axially moving said rotor comprises:
   a bearing in contact with said rotor;
   a slideable bearing retainer in contact with said bearing;
   an annular return spring in contact with said slideable bearing retainer, whereby said narrow annular rubbing surface grooves are in rubbing contact with said washer-shaped seal rings while said rotor is at rest; and
   means for applying hydraulic pressure to the end of said slideable bearing retainer opposite said annular return spring, whereby said slideable bearing retainer, said bearing, and said rotor are axially moved, causing said narrow annular rubbing surface grooves to be spaced from said washer-shaped seal rings while said rotor is at speed.

* * * * *